No. 635,752. Patented Oct. 31, 1899.
G. W. DENYES & O. SCHUTT.
SHOE FOR GRAIN DRILLS.
(Application filed May 24, 1899.)
(No Model.)
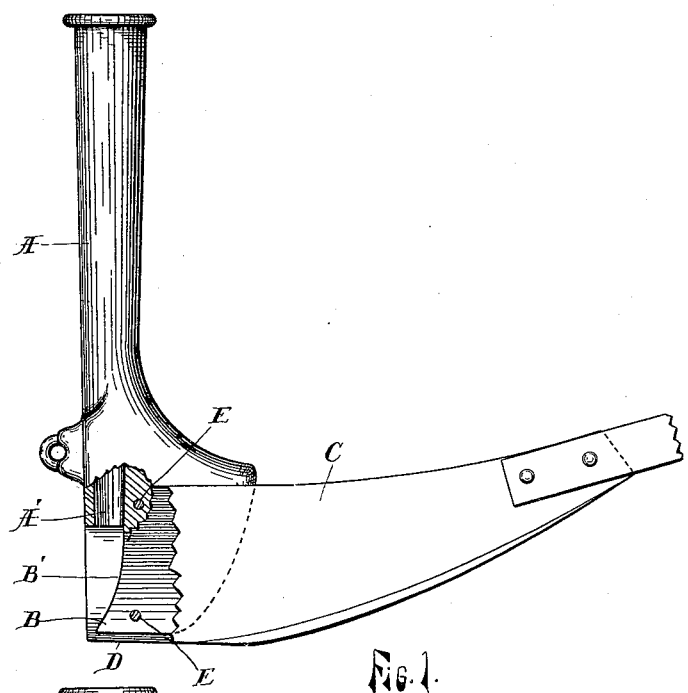
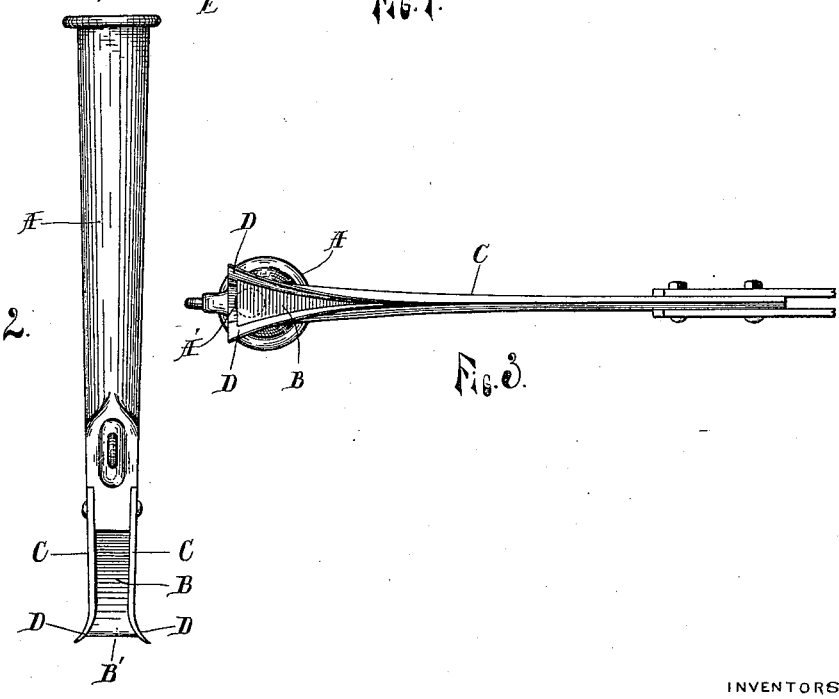
WITNESSES:
INVENTORS.
Gaylard W. Denyes,
Owen Schutt
By
Moulton & Flanders
Attorneys

UNITED STATES PATENT OFFICE.

GAYLARD W. DENYES AND OWEN SCHUTT, OF DOWAGIAC, MICHIGAN.

SHOE FOR GRAIN-DRILLS.

SPECIFICATION forming part of Letters Patent No. 635,752, dated October 31, 1899.

Application filed May 24, 1899. Serial No. 718,124. (No model.)

*To all whom it may concern:*

Be it known that we, GAYLARD W. DENYES and OWEN SCHUTT, citizens of the United States, residing at Dowagiac, in the county of Cass and State of Michigan, have invented certain new and useful Improvements in Shoes for Grain-Drills; and we do hereby declare the following to be a full, clear, and exact description of the invention, such as will enable others skilled in the art to which it appertains to make and use the same.

Our invention relates to improvements in shoes for grain-drills, and more particularly to that class of shoes that are adapted to raise the soil and form a flat-bottomed furrow, deposit the grain on this flat bottom, and distribute the same laterally thereon and replace the raised soil above the said grain. Heretofore attempts to accomplish this result have been made by devices more or less successful in operation, but in every instance consisting of structures too complicated to be made cheaply or otherwise ineffective in operation.

Our invention consists, essentially, in modifying the construction of the shoe in common use, which shoe consists, essentially, of a tubular grain-chute having a downward extension having a sharp wedge-shaped shoe attached formed of two plates and adapted to form a V-shaped groove in the soil and deposit the grain in the same without spreading the grain laterally.

Our invention consists, essentially, in broadening this downward extension and providing it with a flat and rearwardly-curved and downwardly-enlarged face, upon which face the grain is spread laterally in its descent, and in spreading the plates forming the shoe proper at the rear portion of their lower edges and curving the same outward, with their separated lower edges in a horizontal plane, as hereinafter more fully described, reference being had to the accompanying drawings, in which—

Figure 1 is a side elevation of a device embodying our invention with parts broken away; Fig. 2, a rear elevation of the same, and Fig. 3 an inverted plan view of the same.

Like letters refer to like parts in all of the figures.

A represents the vertical tube, through which the grain descends, which tube terminates at A' above the rear end or heel of the shoe.

B is a downward extension of the forward side of the tube A, which extension is made wider at the bottom and with concave sides tapering to a sharp edge at the forward side and having a downward and rearward curved rear surface B', which surface is flat transversely and broadest at the bottom.

The shoe C consists of two plates of suitable shape, the forward portions of which plates are in contact and arranged in vertical planes side by side and are oppositely beveled to form a sharp lower forward edge to enter the soil more readily and also to sever any obstructions. These plates at the rear embrace the fin or extension B and are secured thereto by suitable bolts or other fastenings E. Said plates are also separated and diverge toward the rear and are also curved outward at the lower rear corners, thus forming at the lower rear portion a substantially triangular wedge having a horizontal lower side and having its other sides inwardly and upwardly inclined and concave, diverging rearward, and terminating in the vertical flat forward part of the shoe having a sharp lower edge.

In operation the forward part of the shoe enters the soil and the diverging lower rear parts of the plates operate as plowshares and leave a horizontal flat surface to the soil beneath the shoe of a width equal to the width of the extreme rear of the same. The soil is divided by the forward vertical part C of the shoe and penetrated thereby to the proper depth for depositing the grain. The soil is raised in opposite directions by the concave inclined sides D of the shoe, and as said soil is released it falls back again in place upon the grain, which latter flowing down the tube A strikes on the inclined face B' and is thereby scattered and distributed laterally and evenly over the horizontal plane surface of the soil at the bottom of the furrow or opening formed by the wedge-shaped heel of the shoe.

Having thus fully described our invention, what we claim, and desire to secure by Letters Patent, is—

1. In a grain-drill, the combination of a grain-chute, a downward extension to the same having a rearwardly-inclined face broadened toward the bottom, and side plates attached thereto, said plates being joined at the forward part, and vertical; and separated at the rear, and turned outward at the bottom, substantially as described.

2. In a grain-drill, the combination of a tubular grain-chute, a downward extension to the same having a transversely flat face, said face being also curved rearward, and downwardly broadened, and side plates embracing said extension and secured thereto, said plates being joined and vertical at the front, and separated and curved outward at the rear, substantially as described.

3. In a grain-drill, the combination of a tubular grain-chute, a downward extension of the forward side of the same, said extension being wedge-shaped from front to rear and having concaved sides; and a rear face broadened at the bottom said face also being flat transversely, and concave longitudinally, and side plates embracing said extension and secured thereto, said plates being joined and vertical at the front and diverging rearwardly, and having their rear lower edges horizontal, substantially as described.

In testimony whereof we affix our signatures in presence of two witnesses.

GAYLARD W. DENYES.
OWEN SCHUTT.

Witnesses:
ELI B. YOUNG,
VOLNEY A. OSBORN.